C. R. FRAZER.
FOUR-CYCLE EXPLOSION ENGINE.
APPLICATION FILED SEPT. 10, 1917.
1,292,748.
Patented Jan. 28, 1919.
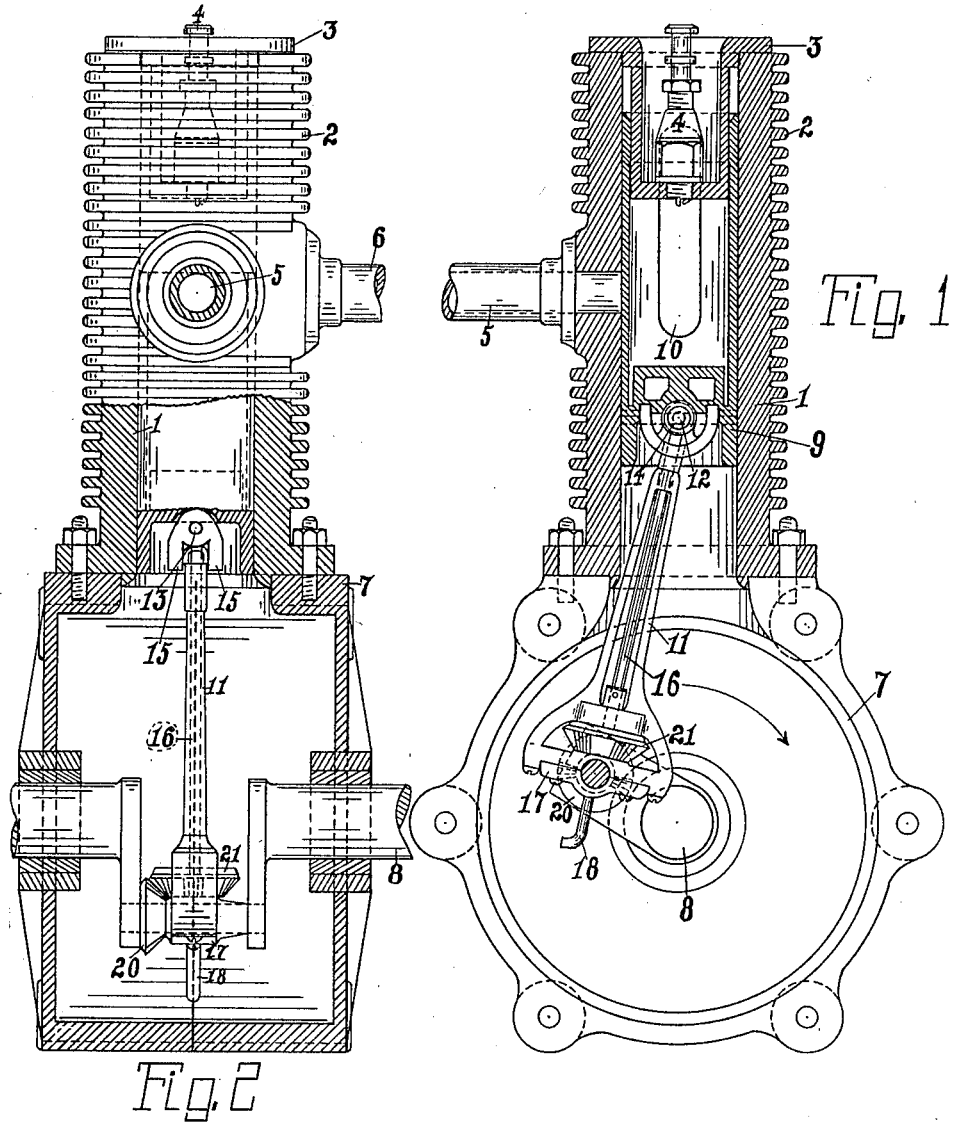
Fig. 1
Fig. 2
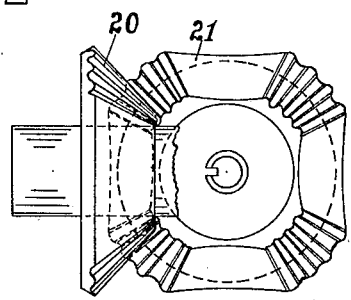
Fig. 3
INVENTOR.
C. R. Frazer.
BY Carlos P. Griffin
ATTORNEY.

UNITED STATES PATENT OFFICE.

CHARLES R. FRAZER, OF SAN FRANCISCO, CALIFORNIA.

FOUR-CYCLE EXPLOSION-ENGINE.

1,292,748. Specification of Letters Patent. Patented Jan. 28, 1919.

Application filed September 10, 1917. Serial No. 190,530.

*To all whom it may concern:*

Be it known that I, CHARLES R. FRAZER, citizen of the United States, residing at San Francisco, in the county of San Francisco, State of California, have invented a new and useful Four-Cycle Explosion-Engine, of which the following is a specification in such full and clear terms as will enable those skilled in the art to construct and use the same.

This invention relates to a four cycle explosion engine in which the piston acts as the valve for admitting the supply of explosive gases and for permitting the escape thereof from the cylinder after the explosion takes place.

Another object of the invention is to provide an engine of the four cycle type with the minimum of moving parts, thereby eliminating much of the wear and tear common to engines with a large number of valves and other movable operating parts.

Other objects of the invention will appear as the description proceeds.

An embodiment of the invention is shown in the drawings in which the same reference numeral is applied to the same portion throughout, but I am aware that there may be modifications thereof.

Figure 1 is a vertical sectional view of the engine looking in the direction of the length of its crank shaft, Fig. 2 is a vertical sectional view of a portion of the crank shaft case and a portion of the engine cylinder in the plane of the crank shaft, and Fig. 3 is a bottom plan view of the two gears which intermittently rotate the piston.

The numeral 1 indicates a cylinder which in the present instance is provided with suitable corrugations 2 to permit of air cooling the same, and which also has a recessed head 3 secured therein, at the bottom of which the spark plug 4 is installed. The cylinder is provided with an inlet pipe 5 on the exhaust pipe 6, which pipes are installed 90 degrees apart. The cylinder is mounted upon a suitable crank case 7, which supports a suitable crank shaft 8. Slidable in the cylinder is a heavy piston 9 which has an elongated port 10 therein of substantially the same length as the stroke of the engine.

The connecting link is shown at 11, and it is connected with the piston by means of two pins 12, 13, which with the ball 14 and yoke 15 form a universal joint to allow the connecting link to move in any plane with respect to the piston. Extending through the connecting link is a rod 16 which is so connected with the piston 9 as to rotate it.

At the bottom of the connecting link, it is provided with a suitable bearing for the crank shaft, and said bearing has an adjustable cap 17 with an oil pipe 18 connected therewith. Rigidly mounted on the crank shaft is an intermittent gear 20. This bevel gear is provided with teeth in two places, and it is in mesh with an intermittent bevel gear 21 on the lower end of the shaft 16. The bevel gear 21 has teeth in four places, and it is provided with stop faces, which engage stop faces on the gear 20 so that the piston will be rotated one complete turn upon each two turns of the crank shaft, the result of this is that, starting in a position so that the port 10 registers with the inlet port 5, the piston will move down to the bottom of its stroke taking in a charge of explosive gas. Upon reaching the bottom of its stroke, the piston will be rotated 90 degrees and will rise on the compression stroke until it is at the top of the compression stroke, whereupon it will be rotated 90 degrees more. The explosion will then take place, and, at the bottom of the explosion stroke, the piston will be rotated 90 degrees until the port 10 registers with the port corresponding to the exhaust pipe 6. The piston will then rise on the exhaust stroke until at the top of the exhaust stroke it is turned 90 degrees more until the port 10 registers with the inlet pipe 5, whereupon the cycle of operations will be repeated.

Having thus described my invention, what I claim as new and desire to secure by Letters Patent of the United States is as follows, express reservation being made of permissible modifications.

1. In an explosion engine, an engine cylinder having inlet and exhaust ports, a ported piston in the engine cylinder, a crank, a link connecting the crank and piston, and two intermittent stub gears carried by the crank and connecting link respectively formed to rotate the piston in quarter turns near the end of each stroke thereof.

2. In a four cycle explosion engine, an engine cylinder having inlet and exhaust ports placed 90 degrees from each other, a ported piston in the cylinder, a crank shaft, a link connecting the piston and crank shaft and intermittent gears carried by the connecting link and crank shaft formed to rotate the piston in quarter turns near the end of each piston stroke.

In testimony whereof I have hereunto set my hand this 31″ day of August A. D. 1917.

CHARLES R. FRAZER.

Copies of this patent may be obtained for five cents each, by addressing the "Commissioner of Patents, Washington, D. C."